(12) United States Patent
Hayashi

(10) Patent No.: US 10,797,600 B2
(45) Date of Patent: Oct. 6, 2020

(54) POWER SUPPLY APPARATUS, MICROBIAL FUEL CELL VOLTAGE BOOSTING CIRCUIT AND MICROBIAL FUEL CELL VOLTAGE BOOSTING SYSTEM

(71) Applicant: Asahi Kasei Microdevices Corporation, Tokyo (JP)

(72) Inventor: Teppei Hayashi, Tokyo (JP)

(73) Assignee: Asahi Kasei Microdevices Corporation, Tokyo (JP)

(*) Notice: Subject to any disclaimer, the term of this patent is extended or adjusted under 35 U.S.C. 154(b) by 0 days.

(21) Appl. No.: 16/226,652

(22) Filed: Dec. 20, 2018

(65) Prior Publication Data

US 2019/0199216 A1    Jun. 27, 2019

(30) Foreign Application Priority Data

Dec. 25, 2017 (JP) ................. 2017-247623

(51) Int. Cl.
*H02M 3/158* (2006.01)
*H02M 1/36* (2007.01)
(Continued)

(52) U.S. Cl.
CPC .......... *H02M 3/1582* (2013.01); *H02M 1/36* (2013.01); *H02M 3/156* (2013.01); *H02M 1/08* (2013.01);
(Continued)

(58) Field of Classification Search
CPC ............ H02M 3/00; H02M 3/02; H02M 3/04; H02M 3/06; H02M 3/07; H02M 3/071;
(Continued)

(56) References Cited

U.S. PATENT DOCUMENTS

| 5,923,154 A * | 7/1999 | Moller ................ H02M 3/1563 323/222 |
| 2007/0210774 A1 | 9/2007 | Kimura |

(Continued)

FOREIGN PATENT DOCUMENTS

| JP | 2005312191 A | 11/2005 |
| JP | 2006320062 A | 11/2006 |

(Continued)

*Primary Examiner* — Thienvu V Tran
*Assistant Examiner* — Carlos O Rivera-Perez

(57) ABSTRACT

To provide a power supply apparatus that can boost input voltage from a low-power input source. A power supply apparatus is provided, including: an inductor connected to an input terminal to which input voltage is applied; a first switch connected between a point between the inductor and an output terminal, and a ground terminal; a drive unit operating the first switch using a signal having amplitude corresponding to the input voltage; and a control unit controlling operation of the first switch and/or outputting of output voltage from the output terminal, according to the output voltage output at the output terminal, wherein the control unit has a first hysteresis comparator, for controlling operation of the first switch, detecting the output voltage output at the output terminal, and/or a second hysteresis comparator, for controlling outputting of the output voltage, detecting the output voltage output at the output terminal.

19 Claims, 12 Drawing Sheets

(51) Int. Cl.
*H02M 3/156* (2006.01)
*H02M 1/08* (2006.01)
*H02M 1/00* (2006.01)
*H02M 3/07* (2006.01)
*H02M 3/155* (2006.01)

(52) U.S. Cl.
CPC .... *H02M 3/073* (2013.01); *H02M 2001/0022* (2013.01); *H02M 2003/1552* (2013.01)

(58) Field of Classification Search
CPC ........ H02M 3/072; H02M 3/073; H02M 3/10; H02M 3/145; H02M 3/155; H02M 3/156; H02M 3/157; H02M 3/158; H02M 3/1563; H02M 3/1582; H02M 3/1588; H02M 3/1584; H02M 1/08; H02M 1/36; H02M 2001/0003; H02M 2001/0006; H02M 2001/0012; H02M 2001/0016; H02M 2001/0022; H02M 2001/0025; H02M 2001/0029; H02M 2001/0032; H02M 2001/0041; H02M 2003/075; H02M 2003/076; H02M 2003/077; H02M 2003/0078; H02M 2003/1552; H02M 2003/1566; H02M 3/135; H02M 3/137; H02M 3/139; H02M 3/142; H02M 1/096; H02M 1/4225; H02M 1/4208; H02M 2001/0035; H02M 2003/1557; Y02B 70/00; Y02B 70/10; Y02B 70/14; Y02B 70/1458; Y02B 70/1466; Y02B 70/16; H02J 7/00; H02J 7/34; H02J 7/35; H02J 7/355; H02J 7/007; H02J 7/0072; H02J 7/0093; H02J 7/0052; H02J 7/38; H02J 7/381; H02J 7/382; H02J 7/383; H02J 7/386; H02J 7/387
USPC ........ 323/222–226, 266, 271–275, 282–289, 323/299–303, 304, 311, 312, 351, 901; 363/18, 22, 49, 74, 89, 123, 124; 320/101, 102
See application file for complete search history.

(56) References Cited

U.S. PATENT DOCUMENTS

| | | |
|---|---|---|
| 2010/0060251 A1 | 3/2010 | Hane |
| 2010/0277147 A1 | 11/2010 | Kimura |
| 2011/0134665 A1* | 6/2011 | Ivanov .................... H02M 1/36 363/49 |
| 2011/0221415 A1 | 9/2011 | Otsuka |
| 2011/0279105 A1* | 11/2011 | Hirose ................ H02M 3/1588 323/311 |
| 2013/0152910 A1* | 6/2013 | Minoya ..................... F02P 5/15 123/625 |
| 2013/0241512 A1 | 9/2013 | Yamada |
| 2015/0280554 A1 | 10/2015 | Yang |
| 2017/0070138 A1* | 3/2017 | Ogawa .................... H02M 3/07 |
| 2017/0141424 A1* | 5/2017 | Lozano ................... C02F 3/006 |
| 2017/0237346 A1 | 8/2017 | Toyama |
| 2018/0254707 A1* | 9/2018 | Matsuura ............ H02M 3/1584 |

FOREIGN PATENT DOCUMENTS

| | | |
|---|---|---|
| JP | 2012060743 A | 3/2012 |
| WO | 2006102929 A1 | 10/2006 |

\* cited by examiner

ND MICROBIAL FUEL CELL VOLTAGE
POWER SUPPLY APPARATUS, MICROBIAL FUEL CELL VOLTAGE BOOSTING CIRCUIT AND MICROBIAL FUEL CELL VOLTAGE BOOSTING SYSTEM

The contents of the following Japanese patent application(s) are incorporated herein by reference:
NO. 2017-247623 filed in JP on Dec. 25, 2017.

BACKGROUND

1. Technical Field

The present invention relates to a power supply apparatus, a microbial fuel cell voltage boosting circuit and a microbial fuel cell voltage boosting system.

2. Related Art

Patent Literature 1 describes a boosting switching power source circuit that boosts power supply voltage and outputs the boosted power supply voltage. If in the boosting switching power source circuit, PWM (Pulse Width Modulation) boosting is performed in a state where the output voltage has not reached a desired voltage, boosting operation is performed at a high duty cycle since the feedback voltage is low, and accordingly inrush current occurs due to the input voltage in some cases. Because of this, the boosting switching power source circuit in Patent Literature 1 is driven at a constant current while the output voltage is lower than the input voltage, and if the output voltage becomes equal to or higher than the input voltage, controls a switching element according to PWM signals to boost the voltage.

Patent Literature 1: Japanese Patent Application Publication No. 2010-68566

SUMMARY

However, if in the boosting switching power source circuit, for example a low-power input source with high output impedance is used, voltage cannot be supplied sufficiently due to a voltage drop resulting from the internal resistance of the boosting switching power source circuit itself, and boosting is not possible in some cases.

In order to overcome the above-mentioned drawback, a first aspect of the present invention provides a power supply apparatus including: an inductor connected to an input terminal to which input voltage is applied; a first switch connected between a point between the inductor and an output terminal, and a ground terminal; a drive unit that operates the first switch using a signal having amplitude corresponding to the input voltage; and a control unit that controls at least one of: operation of the first switch; and outputting of output voltage from the output terminal, according to the output voltage to be output at the output terminal, wherein the control unit has at least one of: a first hysteresis comparator that, for controlling operation of the first switch, detects the output voltage to be output at the output terminal; and a second hysteresis comparator that, for controlling outputting of the output voltage, detects the output voltage to be output at the output terminal.

In addition, a second aspect of the present invention provides a microbial fuel cell voltage boosting circuit including: an inductor connected to an input terminal to which voltage of a microbial fuel cell is applied as input voltage; a first switch connected between a point between the inductor and an output terminal, and a ground terminal; a drive unit that operates the first switch using a signal having amplitude corresponding to the input voltage; and a control unit that controls at least one of: operation of the first switch; and outputting of output voltage from the output terminal, according to the output voltage to be output at the output terminal.

In addition, a third aspect of the present invention provides a microbial fuel cell voltage boosting system including: the microbial fuel cell voltage boosting circuit according to the second aspect; and the microbial fuel cell that applies voltage to the microbial fuel cell voltage boosting circuit.

In addition, a fourth aspect of the present invention provides a power supply apparatus including: a boosting unit that is connected to an input terminal to which input voltage is applied, and boosts the input voltage using a signal having amplitude corresponding to the input voltage; and a control unit that controls at least one of: operation of the boosting unit; and outputting of output voltage from the output terminal, according to the output voltage to be output at output terminal, wherein the control unit has at least one of: a first hysteresis comparator that, for controlling operation of the boosting unit, detects the output voltage to be output at the output terminal; and a second hysteresis comparator that, for controlling outputting of the output voltage, detects the output voltage to be output at the output terminal.

The summary clause does not necessarily describe all necessary features of the embodiments of the present invention. The present invention may also be a sub-combination of the features described above.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
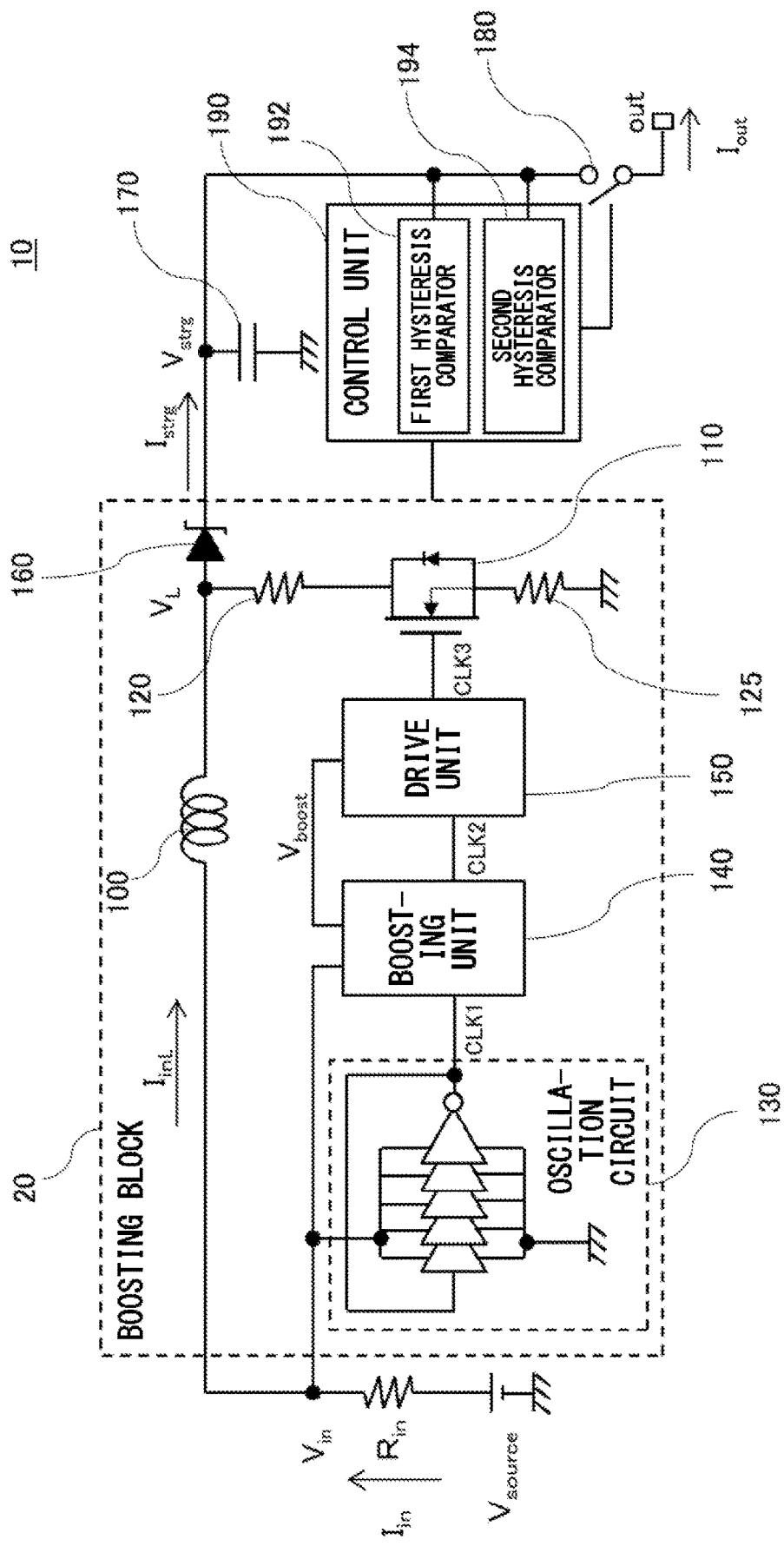
FIG. 1 shows a first configuration example of a power supply apparatus in the present embodiment.

FIG. 1 shows a first configuration example of a power supply apparatus 10 in the present embodiment. The power supply apparatus 10 for example may be a boosting DCDC converter that boosts and outputs input voltage $V_{in}$ supplied from an energy harvest. The energy harvest for example is: photovoltaic power generation using, as the energy source, optical energy from sunlight, incandescent lights, fluorescent lights, LEDs or the like; thermoelectric power generation using, as the energy source, thermal energy from heat generated by machinery, environment temperature or the like; vibration power generation using, as the energy source, vibration generated by machinery or vibration of bridges, roads or the like; electromagnetic wave power generation using electromagnetic waves, electric waves or the like as energy; organism power generation that is represented by microbial fuel cells and converts activity amounts of living beings into energy; or the like.

The power supply apparatus 10 includes an inductor 100, a first switch 110, a first resistor 120, a second resistor 125, an oscillation circuit 130, a boosting unit 140, a drive unit 150, a diode 160, a capacitor 170, a second switch 180 and a control unit 190. In a boosting block 20 including the inductor 100, first switch 110, oscillation circuit 130, boosting unit 140, drive unit 150, first resistor 120, second resistor 125 and diode 160, the power supply apparatus 10 stores energy in the inductor 100 and releases it by switching operation of the first switch 110 to thereby boost a direct current input voltage $V_{in}$ and converts into a direct current output voltage. In the power supply apparatus 10 in FIG. 1, voltage $V_{source}$ supplied from an external input source is stepped down by an internal resistance $R_{in}$ and current $I_{in}$ of the power supply apparatus 10, and the input voltage $V_{in}$ is input through the input terminal.

The inductor 100 has one end connected to the input terminal to which the input voltage $V_{in}$ is applied, and the other end connected to an output terminal out through the diode 160 and second switch 180. In the inductor 100, energy is stored using the input voltage $V_{in}$ when the first switch 110 is turned on, and the voltage $V_{strg}$ increases.

The first switch 110 is connected between a point between the inductor 100 and the diode 160 and a ground terminal, and the gate terminal is connected to the drive unit 150. The first switch 110 is repetitively and alternately turned on and off according to a signal CLK3 input to the gate terminal, and controls current between the inductor 100 and the ground terminal. The first switch 110 for example may be an nMOS.

The first resistor 120 is provided between a point between the inductor 100 and the output terminal out and the first switch 110, and is connected to the drain terminal of the first switch 110. The second resistor 125 is provided between the first switch 110 and the ground terminal, and is connected to the source terminal of the first switch 110. The first resistor 120 and second resistor 125 are used for adjusting current flowing between the drain terminal and source terminal of the first switch 110.

The oscillation circuit 130 is connected between a point between the input terminal and the inductor 100 and the boosting unit 140, and generates and outputs to the boosting unit 140 an oscillating signal CLK1 corresponding to the input voltage $V_{in}$. The oscillation circuit 130 uses the input voltage $V_{in}$ input to the input terminal to generate the oscillating signal CLK1. The oscillation circuit 130 may generate the oscillating signal CLK1 having amplitude which is m-fold (m>0) of the input voltage $V_{in}$, and for example generates the oscillating signal CLK1 having amplitude corresponding to the input voltage $V_{in}$. The oscillation circuit 130 for example is a ring oscillation circuit.

The boosting unit 140 is connected to the drive unit 150, boosts the oscillating signal CLK1 from the oscillation circuit 130 to a signal CLK2 having amplitude corresponding to the input voltage $V_{in}$, and outputs the boosted signal CLK2 to the drive unit 150. The boosting unit 140 may perform the boosting according to the input voltage $V_{in}$, and oscillating signal CLK1, and generate the signal CLK2 so as to attain a voltage sufficient for driving the first switch 110. The boosting unit 140 may boost the oscillating signal CLK1 having amplitude corresponding to the input voltage $V_{in}$ to the signal CLK2 having amplitude $V_{boost}$ which is x-fold (x>1) of the input voltage $V_{in}$. In addition, the boosting unit 140 may output, to the drive unit 150, the voltage $V_{boost}$ obtained by boosting the input voltage $V_{in}$.

The drive unit 150 operates the first switch 110 according to the signal CLK3 having amplitude corresponding to the input voltage $V_{in}$. The drive unit 150 may change the pulse width of the boosted signal CLK2 output by the boosting unit 140, and output the resultant signal as the drive signal CLK3 to the gate terminal of the first switch 110. For example, the drive unit 150 may operate the first switch 110 according to the signal CLK3 that has the same cycle as the oscillating signal CLK1 and has a fixed pulse width not dependent on the input voltage $V_{in}$.

The diode 160 is provided between the inductor 100 and the second switch 180 and closer to the output terminal out than the node to which the first switch 110 is connected is. The diode 160 causes current from the inductor 100 to flow to the output terminal out by rectification.

The capacitor 170 has one end that is connected between the diode 160 and the output terminal out and the other end connected to the ground terminal. The capacitor 170 is used for storing output current $I_{out}$.

The second switch 180 is connected between the inductor 100 and the output terminal out, and is used for controlling outputting of output voltage $V_{strg}$ from the output terminal out by being turned on or off by the control unit 190.

The control unit 190 controls at least one of operation of the boosting block 20 and outputting of the output voltage $V_{strg}$ from the output terminal out according to the output voltage $V_{strg}$ to be output at the output terminal out. The control unit 190 may perform control to stop or start outputting of a signal CLK from at least one of the oscillation circuit 130, the boosting unit 140 and the drive unit 150 to thereby perform control to stop or start switching operation of the first switch 110. In addition, the control unit 190 may directly control the first switch 110 to stop or start the switching operation. In addition, the control unit 190 may turn on or off the second switch 180 to thereby perform control to stop or start outputting of the output voltage $V_{strg}$ from the output terminal out. The control unit 190 has at least one of a first hysteresis comparator 192 and a second hysteresis comparator 194 for detection of the output voltage $V_{strg}$.

The first hysteresis comparator 192 is connected between the diode 160 and the output terminal out, and, for controlling operation of the boosting block 20, detects the output voltage $V_{strg}$ to be output at the output terminal out. The first hysteresis comparator 192 may compare the output voltage $V_{strg}$ with two different thresholds, and the control unit 190 may control operation of the boosting block 20 according to a result of the comparison.

The second hysteresis comparator 194 is connected between the diode 160 and the output terminal out, and, for controlling outputting of the output voltage $V_{strg}$, detects the output voltage $V_{strg}$ to be output at the output terminal out. The second hysteresis comparator 194 may compare the output voltage $V_{strg}$ with two different thresholds, and the control unit 190 may control outputting of the output voltage $V_{strg}$ according to a result of the comparison. The two thresholds for the second hysteresis comparator 194 may be lower than the two thresholds for the first hysteresis comparator 192. In addition, the first hysteresis comparator 192 and second hysteresis comparator 194 may detect voltage between the diode 160 and the second switch 180 as the output voltage $V_{strg}$ to be output at the output terminal out.

Figure 2:
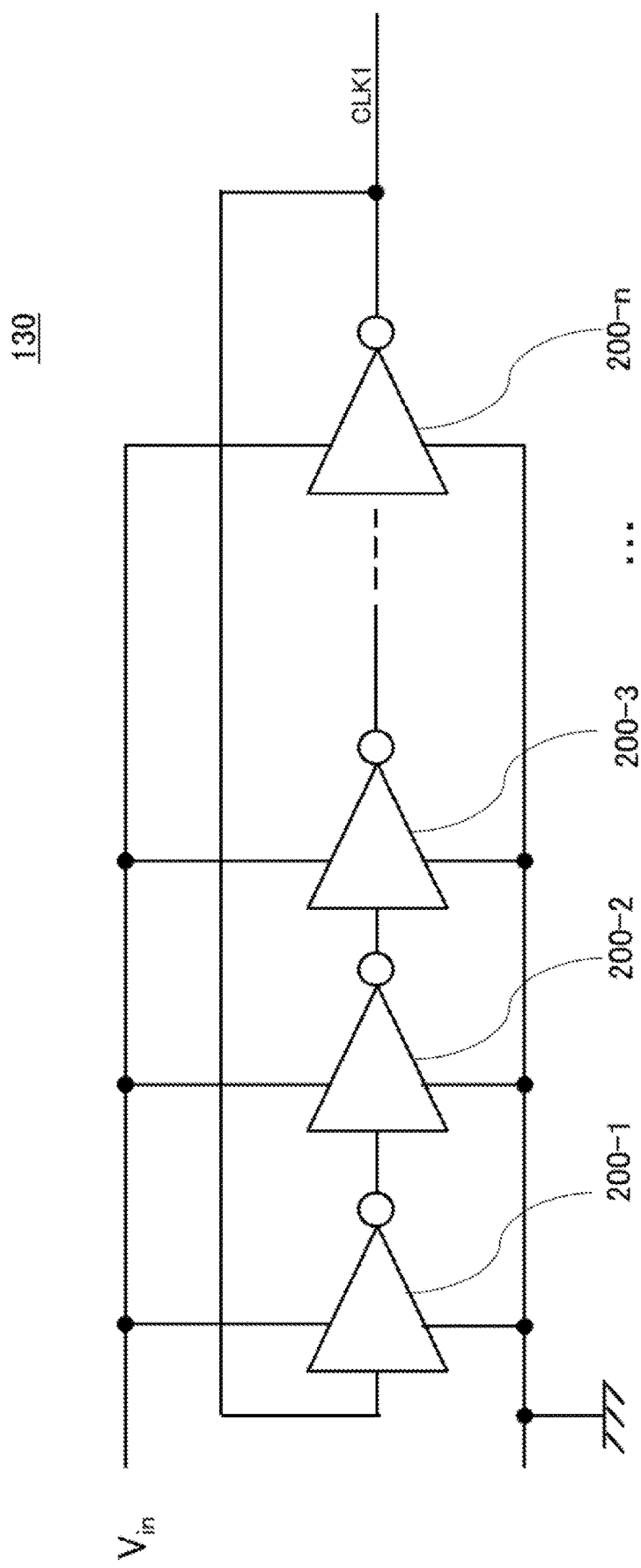
FIG. 2 shows a configuration example of an oscillation circuit.

FIG. 2 shows a configuration example of the oscillation circuit 130. The oscillation circuit 130 shown in FIG. 2 is a ring oscillation circuit, and has n (an odd number of) inverters 200-1 to 200-n that are connected in series. The output of the last inverter 200-n is connected to the input of the first inverter 200-1.

Figure 3:
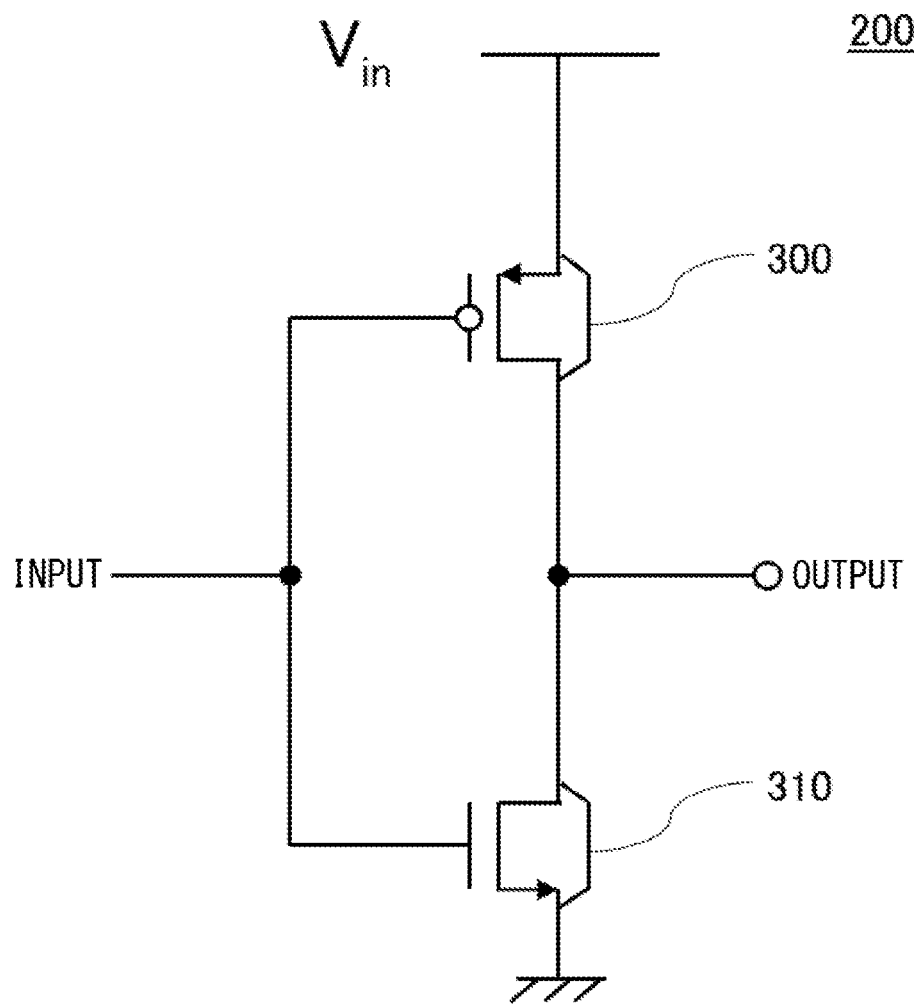
FIG. 3 shows a configuration example of one of a plurality of inverters of the oscillation circuit.

FIG. 3 shows a configuration example of one of the plurality of inverters 200 of the oscillation circuit 130 in FIG. 2. The inverter 200 has a pMOS switch 300 and an nMOS switch 310, and receives an input of a signal input to the inverter 200 at the gate terminals of the pMOS switch 300 and nMOS switch 310, and outputs voltage according to the signal. The source terminal of the pMOS switch 300 receives an input of the input voltage $V_{in}$, the source terminal of the nMOS switch 310 is connected to the ground terminal, and an output is provided between the drain terminal of the pMOS switch 300 and the drain terminal of the nMOS switch 310.

Figure 4:
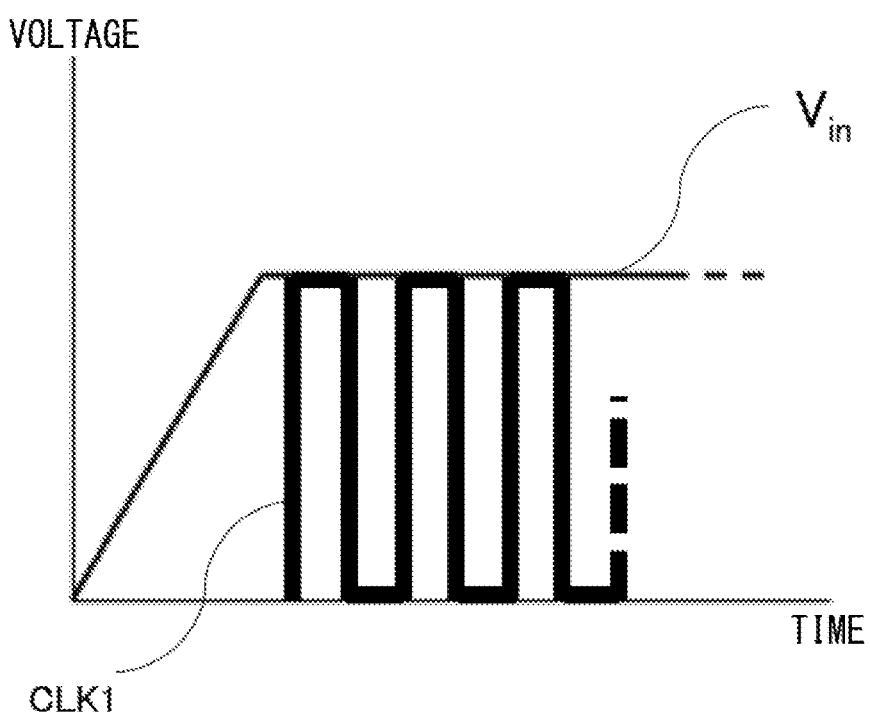
FIG. 4 shows a relationship between oscillating signals output by the oscillation circuit and input voltages.

FIG. 4 shows a relationship between the oscillating signal CLK1 output by the oscillation circuit 130 and the input voltage $V_{in}$. The oscillation circuit 130 starts oscillating operation if the input voltage $V_{in}$ from the input terminal becomes equal to or higher than a predetermined voltage, and outputs the oscillating signal CLK1 having amplitude corresponding to the input voltage $V_{in}$.

Figure 5:
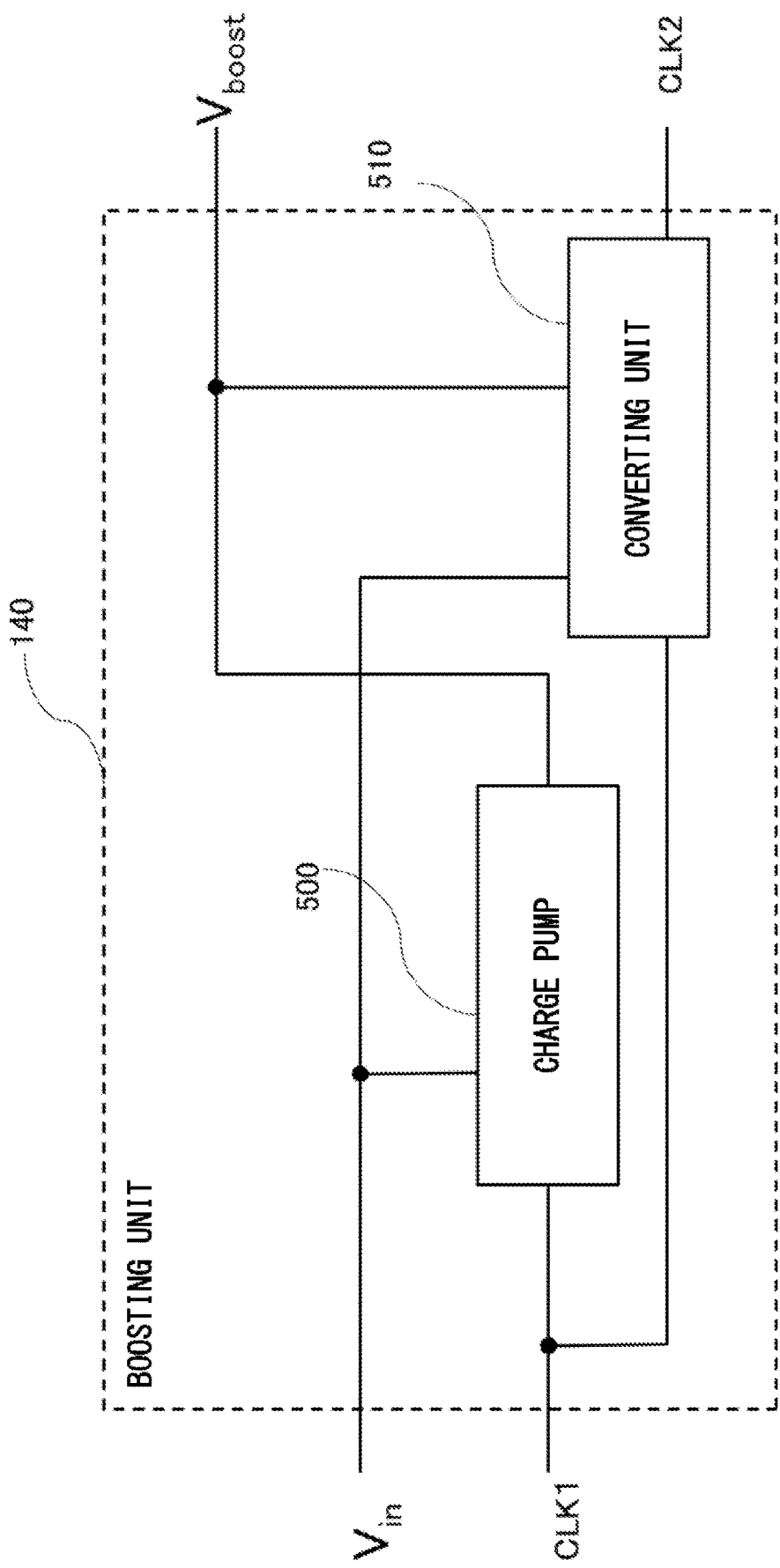
FIG. 5 shows a configuration example of a boosting unit.

FIG. 5 shows a configuration example of the boosting unit 140. The boosting unit 140 may have a two-input two-output configuration that receives inputs of (i) the oscillating signal CLK1 and (ii) the input voltage $V_{in}$, and outputs (i) the signal CLK2 having amplitude corresponding to the boosted voltage $V_{boost}$ and (ii) the boosted voltage $V_{boost}$. The boosting unit 140 has a charge pump 500 and a converting unit 510. The charge pump 500 boosts the input voltage $V_{in}$ to the voltage $V_{boost}$. The converting unit 510 converts the amplitude (peak value) $V_{in}$ of the input oscillating signal CLK1 to the voltage $V_{boost}$.

Figure 6:
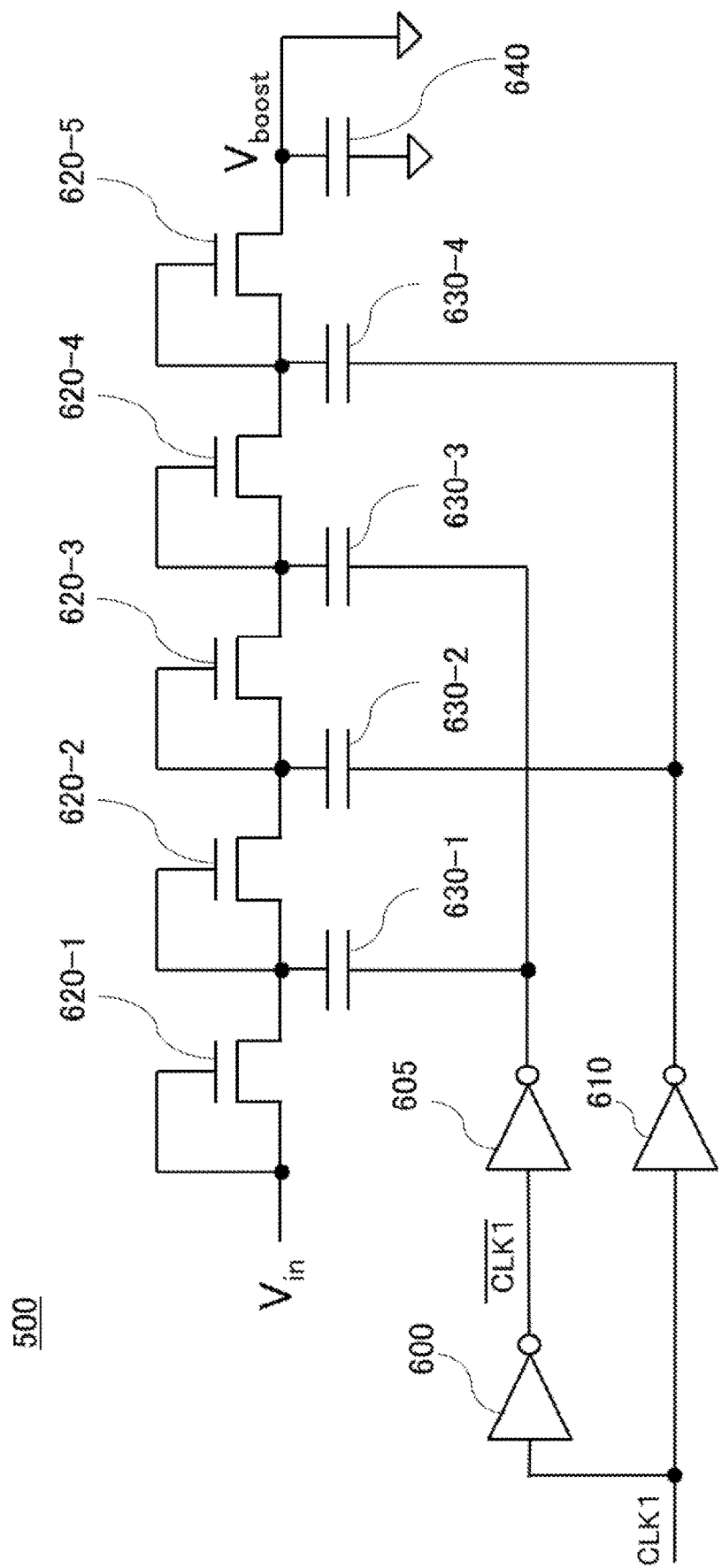
FIG. 6 shows a configuration example of a charge pump.

FIG. 6 shows a configuration example of the charge pump 500. The charge pump 500 may be constituted by a CMOS circuit having a plurality of thresholds including a zero threshold, and may have a bootstrap configuration. The charge pump 500 has inverters 600, 605, 610, nMOS switches 620-1 to 620-5 having diode-connected drain terminals and gate terminals, boosting capacitors 630-1 to 630-4, and a smoothing capacitor 640. The plurality of boosting capacitors 630-1 to 630-4 may have the same capacity.

In the charge pump 500, electric charges flow into the boosting capacitors 630-1 to 630-4 through the nMOS switches 620-1 to 620-5 due to complementary signals CLK1 to −CLK1 input to the inverters 605, 610, boosting is performed at individual nodes between the nMOS switches 620-1 to 620-5, and voltage $V_{boost}$ having a voltage value which is x-fold of the input voltage $V_{in}$ is output. For example, if there are only three nMOS switches 620-1 to 620-3, the boosted voltage $V_{boost}$ is 3 $V_{in}$, and in the case of five switches as shown in FIG. 6, the boosted voltage $V_{boost}$ is 5 $V_{in}$.

Figure 7:
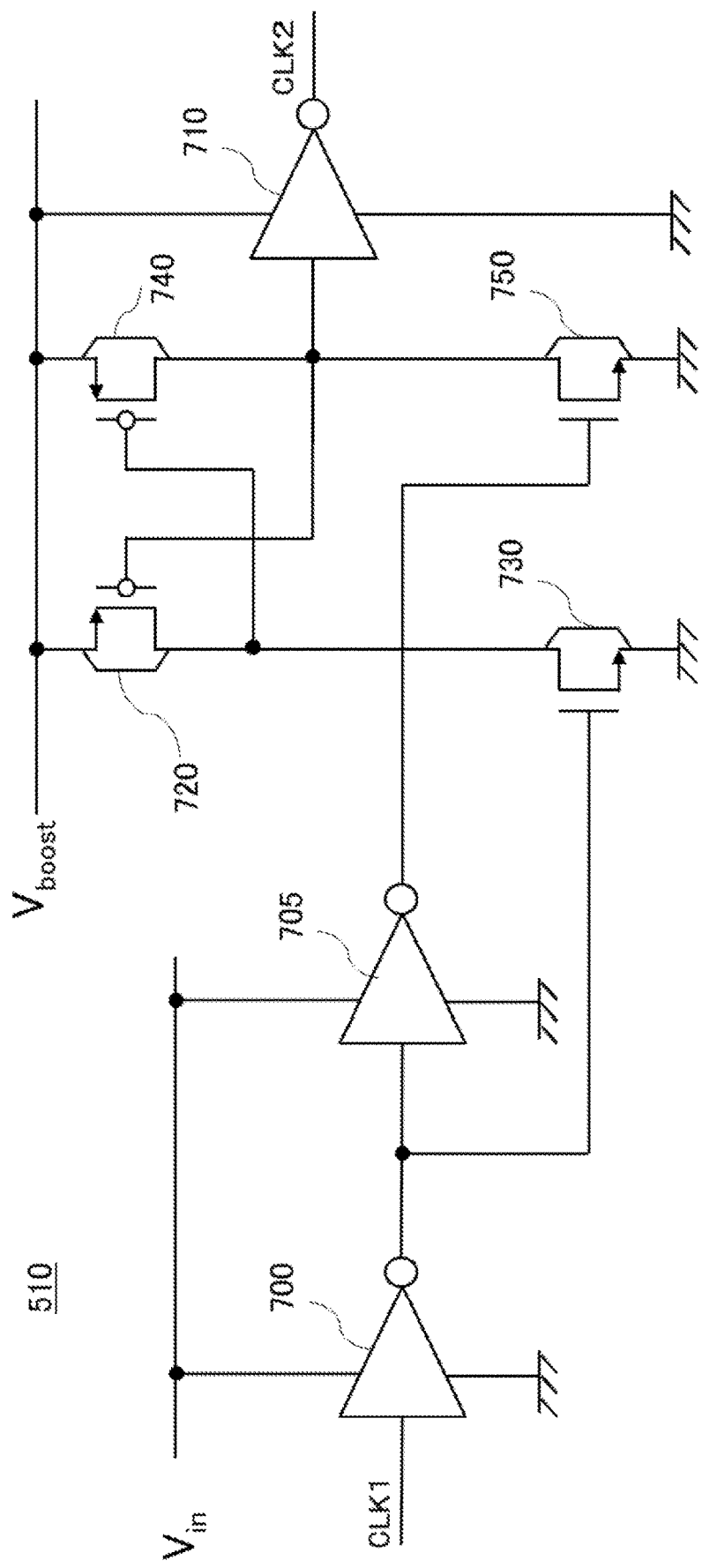
FIG. 7 shows a configuration example of a converting unit.

FIG. 7 shows a configuration example of the converting unit 510. The converting unit 510 has a plurality of inverters 700,705,710 and a plurality of MOS switches 720, 730, 740, 750. The converting unit 510 receives inputs of the oscillating signal CLK1, the input voltage $V_{in}$ and the voltage $V_{boost}$ from the charge pump 500, outputs the signal CLK2 having a peak value that is converted from the input voltage $V_{in}$ to the boosted voltage $V_{boost}$. The inverters 700,705,710 may be the same as the ones shown in FIG. 3.

Figure 8:
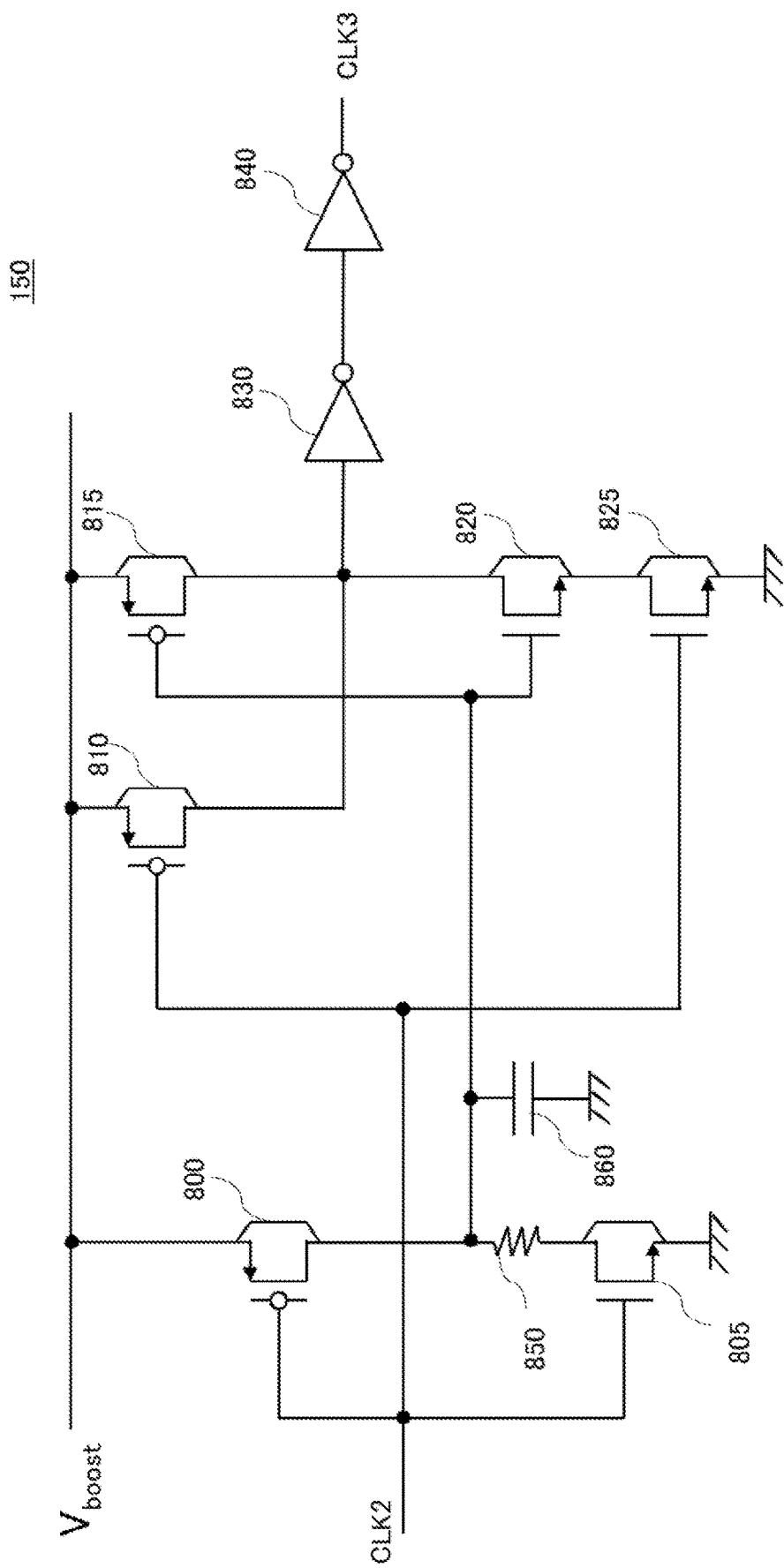
FIG. 8 shows a configuration example of a drive unit.

FIG. 8 shows a configuration example of the drive unit 150. The drive unit 150 outputs a signal with a fixed high-side pulse width not dependent on the input voltage $V_{in}$ for the signal CLK2 boosted by the boosting unit 140. The drive unit 150 has a plurality of MOS switches 800, 805, 810, 815, 820, 825, a plurality of inverters 830, 840, a resistor 850 and a capacitor 860. The drive unit 150 may receive inputs of the boosted voltage $V_{boost}$ and the signal CLK2, and output, as the drive signal CLK3, a signal with a fixed pulse width dependent only on the ratio between the resistance R of the resistor 850 and the capacity C of the capacitor 860 (for example, the time constant τ of R×C with respect to the rising of a signal).

Figure 9:
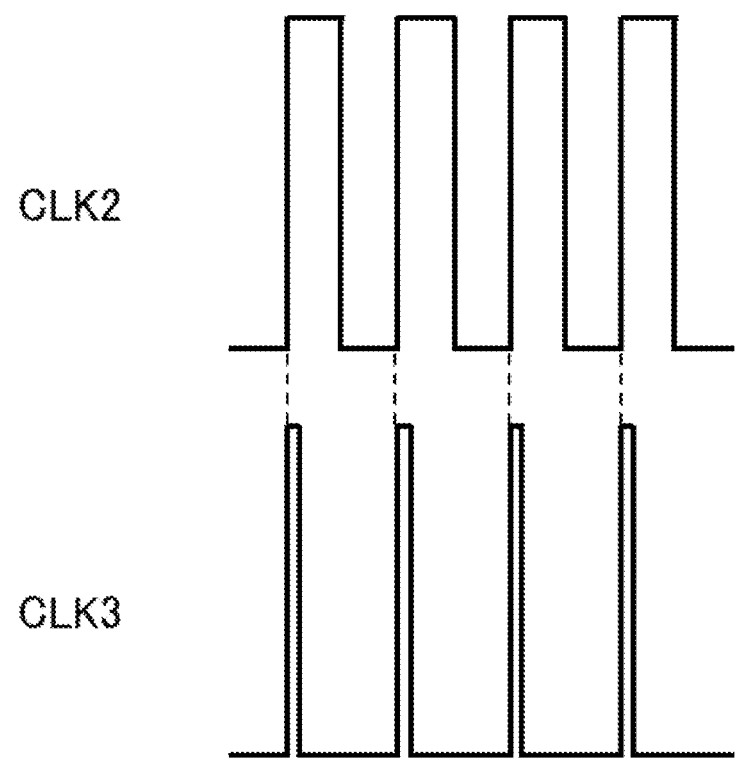
FIG. 9 shows a relationship between a signal CLK2 and a drive signal CLK3 output by the drive unit.

FIG. 9 shows a relationship between the signal CLK2 and the drive signal CLK3 output by the drive unit 150. The signal CLK2 has a pulse width dependent on the input voltage $V_{in}$ in oscillating operation at the oscillation circuit 130. On the other hand, the drive signal CLK3 has a pulse width that is changed to a fixed pulse width from a pulse width dependent on the input voltage $V_{in}$ at the drive unit 150. Since the drive signal CLK3 has the same cycle as the signal CLK2, rising of signals are the same, and the pulse width of the drive signal CLK3 may be shorter than the pulse width of the signal CLK2.

Figure 10:
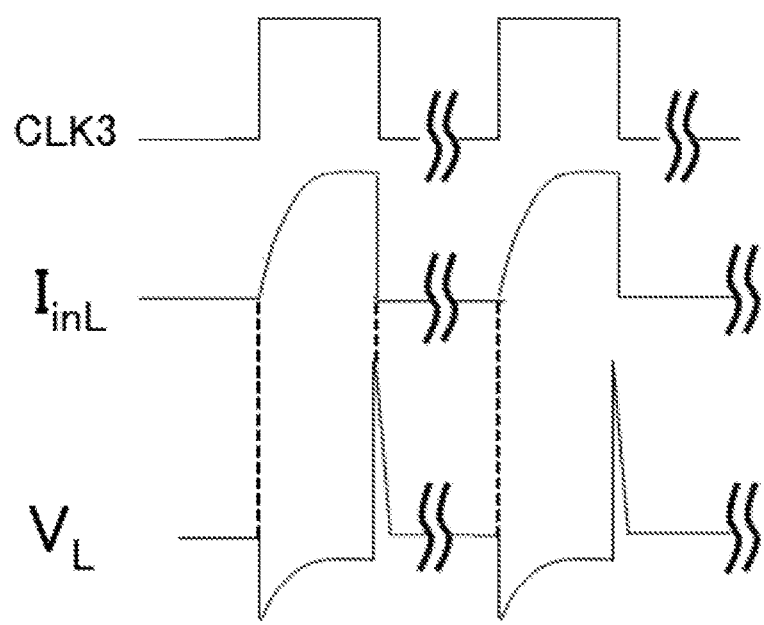
FIG. 10 shows a relationship among a drive signal, current to flow through an inductor, and voltage between the inductor and a diode.

FIG. 10 shows a relationship among the drive signal CLK3, current $I_{inL}$ to flow through the inductor 100, and voltage $V_L$ between the inductor 100 and the diode 160. Next, boosting operation of the power supply apparatus 10 in the present embodiment is explained.

The power supply apparatus 10 starts oscillating operation by the oscillation circuit 130 if it is supplied with voltage from the input source and the input voltage $V_{in}$ becomes a predetermined voltage. Then, the power supply apparatus 10 boosts the oscillating signal CLK1 with the boosting unit 140, and outputs, from the drive unit 150 to the gate terminal of the first switch 110, the drive signal CLK3 having the amplitude $V_{boost}$ corresponding to the input voltage $V_{in}$. In FIG. 10, for example the first switch 110 is turned on when the drive signal CLK3 is high and is turned off when it is low. The current $I_{inL}$ that flows to the inductor 100 flows to the ground terminal through the first switch 110 and its current value increases when the first switch 110 is turned on. The current $I_{inL}$ is blocked not to flow through the first switch 110 when the first switch 110 is turned off, but flows to the output terminal out through the diode 160, and its current value lowers to a predetermined value.

In addition, the voltage $V_L$ generated to the inductor 100 becomes −Ldi/dt for the current $I_{inL}$, when the first switch 110 is turned on. When the first switch 110 is turned off, the voltage $V_L$ generated to the inductor 100 returns to the same voltage as the one before the first switch 110 is turned on.

The power supply apparatus 10 stores energy in the inductor 100 when the first switch 110 is turned on, and if the first switch 110 is turned off, outputs, as current $I_{strg}$, energy at a voltage level exceeding the threshold voltage $V_f$ of the diode 160 for the voltage $V_L$, and stores the energy in the capacitor 170 to thereby attain the boosted output voltage $V_{strg}$.

The power supply apparatus 10 in the present embodiment drives the first switch 110 according to the drive signal CLK3 having the amplitude $V_{boost}$ corresponding to the input voltage $V_{in}$. The first switch 110 causes a variable current dependent on the amplitude $V_{boost}$ of the drive signal CLK3 to flow between the drain terminal and the source terminal. Because of this, the power supply apparatus 10 is subject to feedback to lower the current to flow to the first switch 110 and can perform boosting operation even if the output resistance of the input source is high and the input voltage $V_{in}$ is low.

Figure 11:
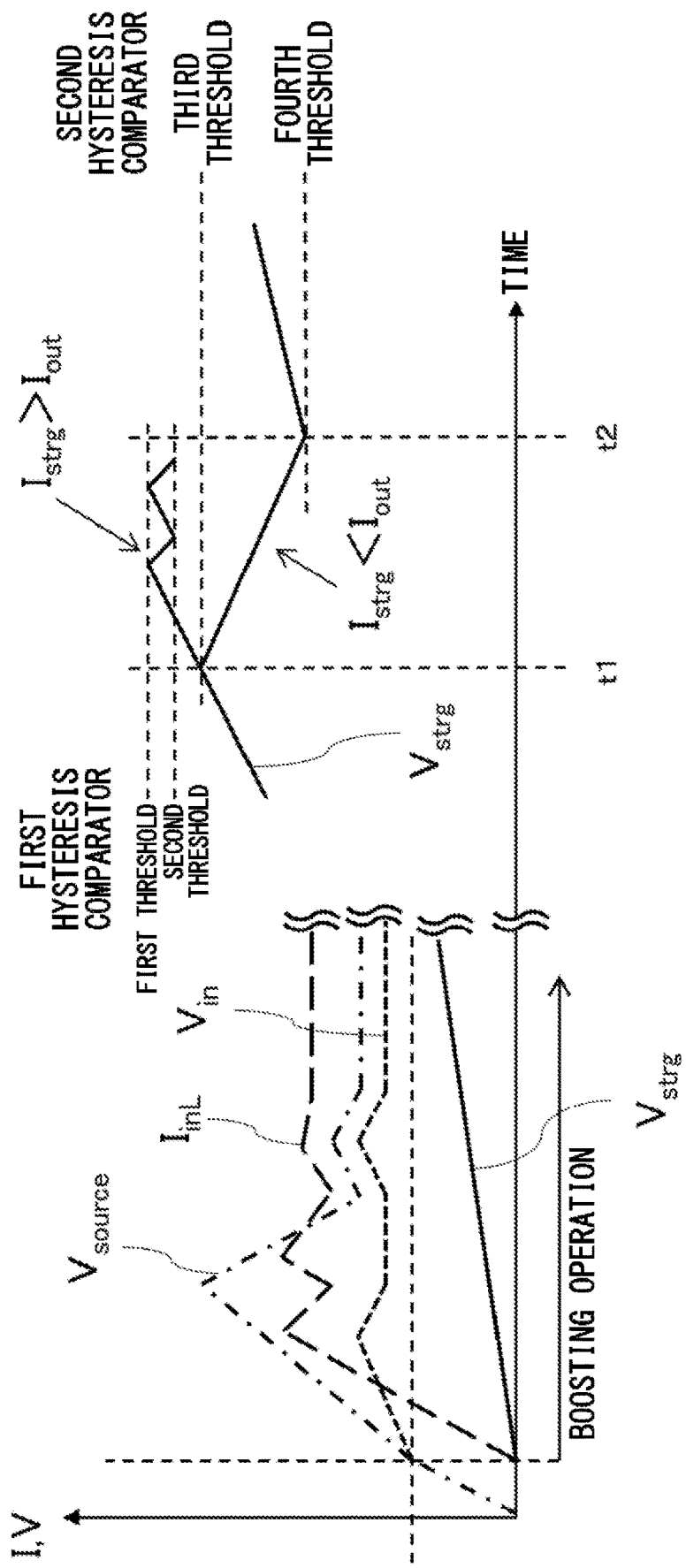
FIG. 11 shows transition of voltage and current in the power supply apparatus.

FIG. 11 shows the temporal transition of voltage and current in the power supply apparatus 10. Next, control on boosting operation by the control unit 190 of the power supply apparatus 10 in the present embodiment is explained.

In the power supply apparatus 10, if the voltage $V_{source}$ supplied from the input source increases, and the input voltage $V_{in}$ input to the input terminal becomes equal to or higher than a predetermined voltage, the oscillation circuit 130 outputs the oscillating signal CLK1 and switchingly turns on and off the first switch 110 to thereby start boosting operation. Starting from the state where initial electric charges are zero, the capacitor 170 stores electric charges by the boosting operation, and the voltage $V_{strg}$ increases.

At the time t1, upon detection at the second hysteresis comparator 194 that the output voltage $V_{strg}$ has become equal to or higher than a third threshold, the control unit 190 turns on the second switch 180, and causes outputting of the output voltage $V_{strg}$ from the output terminal out to be started.

After the time t1, if the output current $I_{out}$ consumed in a system (for example, a load) is larger than the current $I_{strg}$ stored in the capacitor 170 through the diode 160, the output voltage $V_{strg}$ to be output cannot be maintained, and the voltage value gradually lowers. In this case, at the time t2, upon detection at the second hysteresis comparator 194 that the output voltage $V_{strg}$ has become equal to or lower than a fourth threshold, the control unit 190 turns off the second switch 180, and causes outputting of the output voltage $V_{strg}$ to be stopped. Since, during this operation also, the boosting operation is continued, the output voltage $V_{strg}$ increases again, and the control unit 190 causes outputting of the output voltage $V_{strg}$ to be started again if the output voltage $V_{strg}$ becomes equal to or higher than the third threshold.

On the other hand, after the time t1, if the output current $I_{out}$ is lower than the current $I_{strg}$ stored in the capacitor 170 through the diode 160, the output voltage $V_{strg}$ keeps increasing. In this case, upon detection at the first hysteresis comparator 192 that the output voltage $V_{strg}$ has become equal to or higher than the first threshold, the control unit 190 powers down the boosting block 20, and stops boosting operation by stopping switching operation of the first switch 110. Thereby, the output voltage $V_{strg}$ gradually lowers.

After stopping the switching operation, upon detection at the first hysteresis comparator 192 that the output voltage $V_{strg}$ has become equal to or lower than the second threshold, the control unit 190 starts operation (boosting operation) of the first switch 110. Thereby, even if the output current $I_{out}$ is lower than the current $I_{strg}$ stored in the capacitor 170 through the diode 160, the control unit 190 can control the output voltage $V_{strg}$ between the first threshold and the second threshold.

The power supply apparatus 10 in the present embodiment does not require complicated control such as PWM unlike conventional techniques, suppresses current consumption, and enables highly precise DCDC conversion at low power and with a simple configuration. The power supply apparatus 10 can judge that the voltage $V_{strg}$ to be output is adjusted to voltage within a predetermined level range at the hysteresis comparator of the control unit 190, and output the voltage $V_{strg}$.

The power supply apparatus 10 in the present embodiment may be a microbial fuel cell voltage boosting circuit to which voltage of a microbial fuel cell is applied as input voltage. The microbial fuel cell voltage boosting circuit may have a configuration similar to that of the power supply apparatus 10 in the present embodiment, and receives, at its input terminal, voltage from the microbial fuel cell. In addition, the microbial fuel cell voltage boosting circuit and the microbial fuel cell connected to the microbial fuel cell voltage boosting circuit may constitute a microbial fuel cell voltage boosting system. For example, the microbial fuel cell may be one that generates electric energy utilizing anaerobic current-generating bacteria in soil or water.

Figure 12:
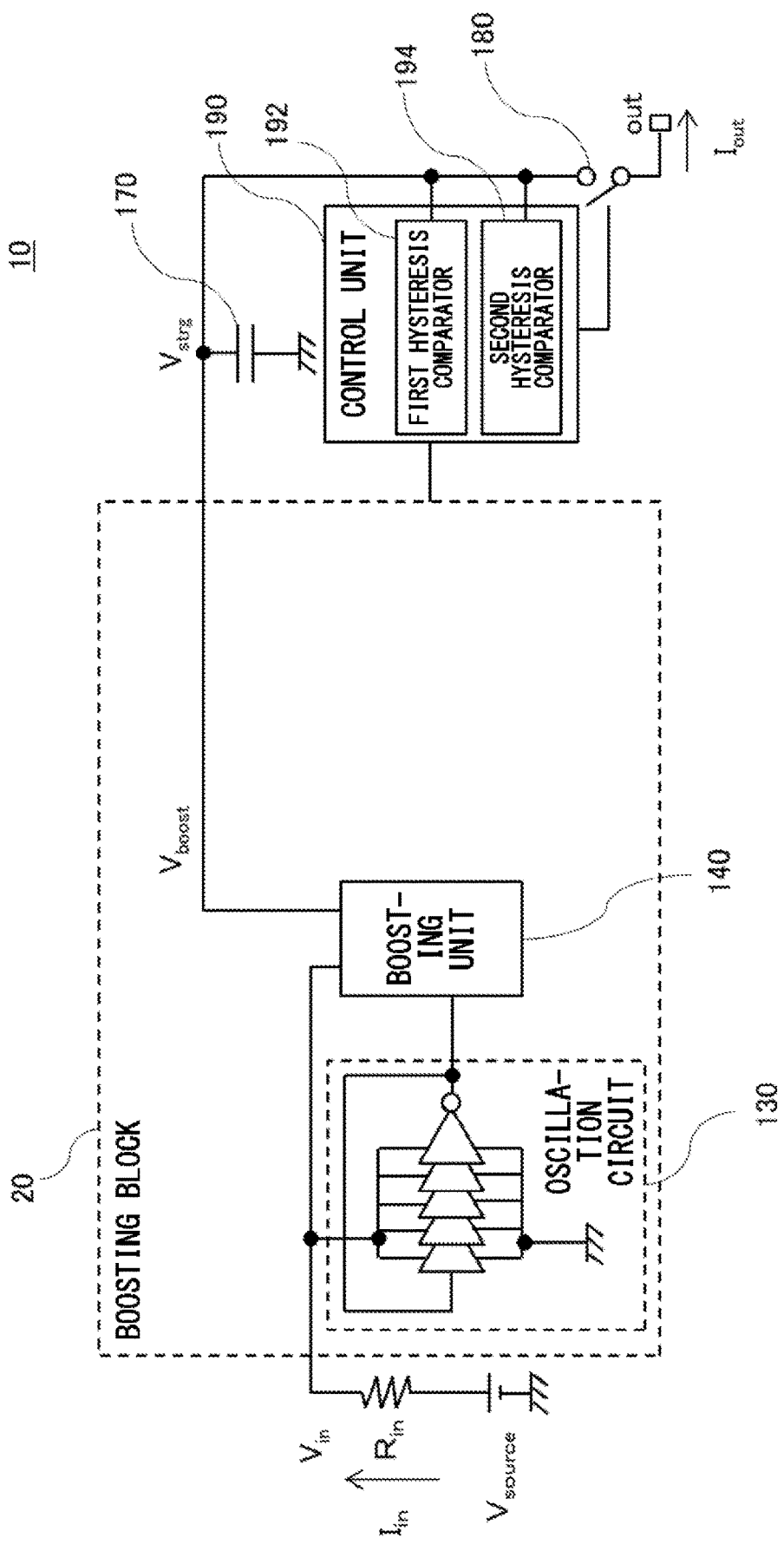
FIG. 12 shows a second configuration example of the power supply apparatus in the present embodiment.

FIG. 12 shows a second configuration example of the power supply apparatus 10 in the present embodiment. The power supply apparatus 10 in the second configuration example has a configuration similar to that of the power supply apparatus 10 in the first configuration example, but the output of the boosting unit 140 is directly connected to the output terminal out. In the power supply apparatus 10 in the second configuration example, explanations about parts of the configuration that are substantially the same as those of the power supply apparatus 10 in the first configuration example are omitted.

The boosting unit 140 in the second configuration example may have a configuration similar to that of the boosting unit 140 in the first configuration example, and operate in a similar manner to that of the boosting unit 140 in the first configuration example. The boosting unit 140 in the second configuration example may be connected to the output terminal out through the second switch 180, and output the voltage $V_{boost}$ obtained by boosting the input voltage $V_{in}$.

The first hysteresis comparator 192 is connected between the boosting unit 140 and the output terminal out, and, for controlling operation of the boosting block 20, detects the output voltage $V_{strg}$ to be output at the output terminal out. The second hysteresis comparator 194 is connected between the boosting unit 140 and the output terminal out, and, for controlling outputting of the output voltage $V_{strg}$, detects the output voltage $V_{strg}$ to be output at the output terminal out.

Similar to the first configuration example, the control unit 190 may control turn-on and turn-off of the second switch 180 and/or boosting operation of the boosting unit 140 according to a result of comparison of the output voltage $V_{strg}$ with a threshold at the first hysteresis comparator 192 and second hysteresis comparator 194.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A power supply apparatus comprising:
an inductor connected to an input terminal to which input voltage is applied;
a first switch connected between a point between the inductor and an output terminal, and a ground terminal;
a drive unit that operates the first switch using a signal having amplitude corresponding to the input voltage; and
a control unit that has a first hysteresis comparator that, for controlling operation of the first switch, detects an output voltage to be output at the output terminal, and a second hysteresis comparator that, for controlling outputting of the output voltage, detects the output voltage to be output at the output terminal, wherein
a first voltage threshold is an upper threshold of the first hysteresis comparator, a second voltage threshold is a lower threshold of the first hysteresis comparator, a third voltage threshold is an upper threshold of the second hysteresis comparator, a fourth voltage threshold is a lower threshold of the second hysteresis comparator,
the control unit stops operation of the first switch upon detection at the first hysteresis comparator that the output voltage is equal to or higher than the first voltage threshold, and thereafter starts operation of the first switch upon detection at the first hysteresis comparator that the output voltage is equal to or lower than the second voltage threshold,
a second switch between the inductor and the output terminal, wherein the control unit turns on the second switch and causes outputting of the output voltage to be started upon detection at the second hysteresis comparator that the output voltage is equal to or higher than the third voltage threshold, and thereafter turns off the second switch and causes outputting of the output voltage to be stopped upon detection at the second hysteresis comparator that the output voltage is equal to or lower than the fourth voltage threshold, and
the second voltage threshold is greater than the third voltage threshold.

2. The power supply apparatus according to claim 1, comprising a boosting unit that outputs, to the drive unit, a signal boosted to have amplitude corresponding to the input voltage, wherein
the drive unit operates the first switch according to the signal boosted.

3. The power supply apparatus according to claim 2, comprising an oscillation circuit that is connected between a point between the input terminal and the inductor, and the boosting unit, and outputs, to the boosting unit, an oscillating signal having amplitude corresponding to the input voltage.

4. The power supply apparatus according to claim 3, wherein the signal having amplitude corresponding to the input voltage has the same cycle as the oscillating signal and has a fixed pulse width not dependent on the input voltage.

5. The power supply apparatus according to claim 3, wherein
the boosting unit includes a charge pump that boosts the input voltage to a boosted voltage corresponding to the oscillating signal, and a converting unit that converts the amplitude of the oscillating signal to the boosted voltage.

6. The power supply apparatus according to claim 1, comprising a first resistor provided between the point between the inductor and the output terminal, and the first switch, and a second resistor provided between the first switch and the ground terminal.

7. The power supply apparatus according to claim 1, wherein the input terminal receives, as the input voltage, input of voltage from an energy harvest.

8. The power supply apparatus according to claim 1, wherein the control unit has the second hysteresis comparator that, for controlling outputting of the output voltage, detects the output voltage to be output at the output terminal, and the control unit controls outputting of output voltage from the output terminal according to the output voltage to be output at the output terminal.

9. The power supply apparatus according to claim 1, wherein the second hysteresis comparator compares, with the third voltage threshold, a voltage between the inductor and a second switch, the second switch provided between the inductor and the output terminal.

10. The power supply apparatus according to claim 1, wherein the second hysteresis comparator compares, with the fourth voltage threshold, a voltage between the inductor and a second switch, the second switch provided between the inductor and the output terminal.

11. The power supply apparatus according to claim 1, wherein the first voltage threshold of the first hysteresis comparator is greater than the second voltage threshold of the first hysteresis comparator, and the third voltage threshold of the second hysteresis comparator is greater than the fourth voltage threshold of the second hysteresis comparator.

12. A microbial fuel cell voltage boosting circuit comprising:
an inductor connected to an input terminal to which voltage of a microbial fuel cell that generates electric energy utilizing anaerobic current-generating bacteria in soil or water is applied as input voltage;
a first switch connected between a point between the inductor and an output terminal, and a ground terminal;
a drive unit that operates the first switch using a signal having amplitude corresponding to the input voltage; and
a control unit that has a first hysteresis comparator that, for controlling operation of the first switch, detects an output voltage to be output at the output terminal, and a second hysteresis comparator that, for controlling outputting of the output voltage, detects the output voltage to be output at the output terminal, wherein
a first voltage threshold is an upper threshold of the first hysteresis comparator, a second voltage threshold is a lower threshold of the first hysteresis comparator, a third voltage threshold is an upper threshold of the second hysteresis comparator, a fourth voltage threshold is a lower threshold of the second hysteresis comparator,
the control unit stops operation of the first switch upon detection at the first hysteresis comparator that the output voltage is equal to or higher than the first voltage threshold, and thereafter starts operation of the first switch upon detection at the first hysteresis comparator that the output voltage is equal to or lower than the second voltage threshold,
a second switch between the inductor and the output terminal, wherein the control unit turns on the second switch and causes outputting of the output voltage to be started upon detection at the second hysteresis comparator that the output voltage is equal to or higher than the third voltage threshold, and thereafter turns off the second switch and causes outputting of the output voltage to be stopped upon detection at the second hysteresis comparator that the output voltage is equal to or lower than the fourth voltage threshold, and the second voltage threshold is greater than the third voltage threshold.

13. A microbial fuel cell voltage boosting system comprising:

the microbial fuel cell voltage boosting circuit according to claim 12; and the microbial fuel cell that applies voltage to the microbial fuel cell voltage boosting circuit.

14. A power supply apparatus comprising:

a boosting unit that is connected to an input terminal to which input voltage is applied, and boosts the input voltage using a signal having amplitude corresponding to the input voltage; and an inductor connected to the input terminal to which input voltage is applied;

a first switch connected between a point between the inductor and an output terminal, and a ground terminal;

a control unit that controls operation of the boosting unit and outputting of output voltage from the output terminal, according to the output voltage to be output at the output terminal, wherein the control unit has a first hysteresis comparator that, for controlling operation of the boosting unit, detects the output voltage to be output at the output terminal; and a second hysteresis comparator that, for controlling outputting of the output voltage, detects the output voltage to be output at the output terminal, wherein a first voltage threshold is an upper threshold of the first hysteresis comparator, a second voltage threshold is a lower threshold of the first hysteresis comparator, a third voltage threshold is an upper threshold of the second hysteresis comparator, a fourth voltage threshold is a lower threshold of the second hysteresis comparator, the control unit stops operation of the first switch upon detection at the first hysteresis comparator that the output voltage is equal to or higher than the first voltage threshold, and thereafter starts operation of the first switch upon detection at the first hysteresis comparator that the output voltage is equal to or lower than the second voltage threshold, a second switch between the inductor and the output terminal, wherein the control unit turns on the second switch and causes outputting of the output voltage to be started upon detection at the second hysteresis comparator that the output voltage is equal to or higher than the third voltage threshold, and thereafter turns off the second switch and causes outputting of the output voltage to be stopped upon detection at the second hysteresis comparator that the output voltage is equal to or lower than the fourth voltage threshold, and the second voltage threshold is greater than the third voltage threshold.

15. The power supply apparatus according to claim 14, comprising an oscillation circuit that is connected between the input terminal and the boosting unit, and outputs, to the boosting unit, an oscillating signal having amplitude corresponding to the input voltage.

16. The power supply apparatus according to claim 14, wherein the control unit has the second hysteresis comparator that, for controlling outputting of the output voltage, detects the output voltage to be output at the output terminal, and the control unit controls outputting of output voltage from the output terminal according to the output voltage to be output at the output terminal.

17. The power supply apparatus according to claim 14, wherein the second hysteresis comparator compares, with the third voltage threshold, a voltage between the inductor and a second switch, the second switch provided between the inductor and the output terminal.

18. The power supply apparatus according to claim 14, wherein the second hysteresis comparator compares, with the fourth voltage threshold, a voltage between the inductor and a second switch, the second switch provided between the inductor and the output terminal.

19. A power supply apparatus comprising:

an inductor connected to an input terminal to which input voltage is applied;

a first switch connected between a point between the inductor and an output terminal, and a ground terminal;

a drive unit that operates the first switch using a signal having amplitude corresponding to the input voltage;

a second switch between the inductor and the output terminal; and a control unit that has a first hysteresis comparator that, for controlling operation of the first switch, detects an output voltage to be output at the output terminal, and a second hysteresis comparator that, for controlling outputting of the output voltage, detects the output voltage to be output at the output terminal, wherein a first voltage threshold is an upper threshold of the first hysteresis comparator, a second voltage threshold is a lower threshold of the first hysteresis comparator, a third voltage threshold is an upper threshold of the second hysteresis comparator, a fourth voltage threshold is a lower threshold of the second hysteresis comparator, the control unit stops operation of the first switch upon detection at the first hysteresis comparator that the output voltage is equal to or higher than the first voltage threshold, and thereafter starts operation of the first switch upon detection at the first hysteresis comparator that the output voltage is equal to or lower than the second voltage threshold, the control unit turns on the second switch and causes outputting of the output voltage to be started upon detection at the second hysteresis comparator that the output voltage is equal to or higher than the third voltage threshold, and thereafter turns off the second switch and causes outputting of the output voltage to be stopped upon detection at the second hysteresis comparator that the output voltage is equal to or lower than the fourth voltage threshold, and the second voltage threshold is greater than the third voltage threshold.

* * * * *